US006630956B1

(12) United States Patent
Toi

(10) Patent No.: US 6,630,956 B1
(45) Date of Patent: Oct. 7, 2003

(54) DEVICE AND METHOD FOR PROCESSING COLOR SIGNALS EMPLOYING VECTOR OPERATION COLOR SPACE CONVERSION MEANS

(75) Inventor: Takao Toi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/289,925

(22) Filed: Apr. 14, 1999

(30) Foreign Application Priority Data

Apr. 16, 1998 (JP) .......................................... 10/106810

(51) Int. Cl.$^7$ ......................... H04N 3/14; H04N 5/335; H04N 9/04; H04N 9/083; H04N 9/73
(52) U.S. Cl. ...................... 348/273; 348/272; 348/277; 348/280; 348/223.1
(58) Field of Search ............................... 348/272, 273, 348/277, 280, 223.1

(56) References Cited

U.S. PATENT DOCUMENTS

| | | | | |
|---|---|---|---|---|
| 5,132,788 A | * | 7/1992 | Hirota | 358/517 |
| 5,262,849 A | * | 11/1993 | Mimura et al. | 348/224.1 |
| 5,528,292 A | * | 6/1996 | Ikeda | 348/222.1 |
| 6,034,724 A | * | 3/2000 | Nakamura | 348/241 |
| 6,147,707 A | * | 11/2000 | Terasawa et al. | 348/229.1 |
| 6,295,139 B1 | * | 9/2001 | Yamauchi et al. | 358/443 |
| 6,356,306 B1 | * | 3/2002 | Kobayashi | 348/322 |

FOREIGN PATENT DOCUMENTS

| | | |
|---|---|---|
| JP | 61-227492 | 10/1986 |
| JP | 1-307366 | 12/1989 |
| JP | 3-124190 | 5/1991 |
| JP | 4-170883 | 6/1992 |
| JP | 5-64206 | 3/1993 |
| JP | 11-113006 | 4/1999 |
| JP | 11-177997 | 7/1999 |

OTHER PUBLICATIONS

M.R. Choudhury, et al., "A 300 MHz CMOS Microprocessor With Multi–Media Technology", 1997 IEEE International Solid–State Circuits Conference Digest of Technical Papers, First Edition, vol. 40, ISSCC, pp. 170, 171 and 450.
Copy of Japanese Office dated Jan. 7, 2003 and English translation of relevant portion.
Japanese Office action issued Feb. 6, 2001 in a related application with English translation of relevant portions.

* cited by examiner

*Primary Examiner*—Wendy R. Garber
*Assistant Examiner*—James Hannett
(74) *Attorney, Agent, or Firm*—Dickstein, Shapiro, Morin & Oshinsky, LLP.

(57) ABSTRACT

A color signal processing device for processing color signals outputted by an image pickup device provided with a color filter having color areas of N colors (N≧3) corresponding to each pixel is provided. The color signal processing device comprises a vector operation section for executing color space conversion, in stead of a matrix operation section in conventional color signal processing devices. The vector operation section is supplied with a color signal which corresponds to the intensity of light that reached a pixel of the image pickup device through a color area of the color filter on the pixel, obtains a color signal component vector by multiplying the color signal by a vector having N vector elements, and thereby extracts N color signal components corresponding to the N colors from the color signal. The vector operation section extracts a red signal component, a green signal component and a blue signal component, for example. The output of the vector operation section is processed thereafter by white balance sections and a color interpolation section. By employing the vector operation section in stead of the matrix operation section, the number of multiplications necessary for obtaining an output signal for one pixel can be decreased, and thus color signal processing speed, circuit scale, power consumption and manufacturing cost of single CCD color cameras can be reduced.

2 Claims, 5 Drawing Sheets

FIG. 3

| R | G | R | G |
|---|---|---|---|
| G | B | G | B |
| R | G | R | G |
| G | B | G | B |

FIG. 4

| Mg | G  | Mg | G  |
|----|----|----|----|
| Cy | Ye | Cy | Ye |
| G  | Mg | G  | Mg |
| Cy | Ye | Cy | Ye |

DEVICE AND METHOD FOR PROCESSING COLOR SIGNALS EMPLOYING VECTOR OPERATION COLOR SPACE CONVERSION MEANS

BACKGROUND OF THE INVENTION

The present invention relates to a color signal processing device and a color signal processing method which are applied to color digital cameras etc.

DESCRIPTION OF THE PRIOR ART

Today, color signal processing devices and color signal processing methods are widely employed in digital cameras which are used as input devices for computers. Especially, digital still cameras for shooting and recording still images are now being widely used to the same extent as the conventional cameras using AgCl films, and video meeting (teleconference) systems using digital cameras and computers are also being used. Also in the field of video cameras for recording moving pictures in magnetic tapes, digital video cameras are prevailing since image deterioration does not occur due to image processing. For processing image signals in such digital cameras, a special-purpose image processing logic circuit or a general-purpose CPU (and software) is utilized.

FIG. 1 is a block diagram showing an example of a conventional color signal processing device and a conventional color signal processing method for processing color signals outputted by a solid-state image pickup device. The conventional color signal processing device and the conventional color signal processing method are employed in video cameras for recording moving video pictures or digital still cameras for recording still images.

In the following, an example which employs a color filter shown in FIG. 3 on a solid-state image pickup device (CCD) 200 will be explained, for instance. Referring to FIG. 3, each area on the color filter with a letter "R", "G" or "B" corresponds to a pixel (element) of the solid-state image pickup device 200. The area on the color filter with a letter "R" transmits red light and filters out green light and blue light. The area with a letter "G" transmits green light and filters out blue light and red light. The area with a letter "B" transmits blue light and filters out red light and green light. Each pixel (element) of the solid-state image pickup device 200 receives the red light, the green light or the blue light which passed the corresponding area of the color filter, and outputs an analog image output signal whose level corresponds to the intensity of the light that passed the corresponding area. The analog image output signal outputted by the solid-state image pickup device 200 is supplied to an A/D converter 201. The A/D converter 201 converts the analog image output signal into a digital signal and outputs the digital signal to a color interpolation section 202. In the color interpolation section 202, digital signals corresponding to colors (wavelength regions) which the area of the color filter did not transmit (in the case of the pixel corresponding to the area with the letter "R", a green signal and a blue signal) are obtained by interpolation using digital signals (green signals and blue signals) from adjacent pixels. In the case where the color space of the output of the color interpolation section 202 is the RGB color space (i.e. in the case where the color filter on the solid-state image pickup device 200 has red areas, green areas and blue areas), signals outputted by the color interpolation section 202 are composed of a red signal r0, a green signal g0 and a blue signal b0. The signals r0, g0 and b0 outputted by the color interpolation section 202 are supplied to a matrix operation section (color space conversion section) 203 having a 3×3 matrix. The matrix operation section 203 executes color space conversion to each signal using the 3×3 matrix so as to match a desired color space. The output of the matrix operation section 203 (a red signal r1, a green signal g1 and a blue signal b1) can be obtained by the following equation. Incidentally, in the following, matrixes and vectors are represented by capital letters, and scalar quantities are represented by small (lower-case) letters.

$$\begin{pmatrix} r1 \\ g1 \\ b1 \end{pmatrix} = M \begin{pmatrix} r0 \\ g0 \\ b0 \end{pmatrix} \quad M = \begin{pmatrix} m11 & m12 & m13 \\ m21 & m22 & m23 \\ m31 & m32 & m33 \end{pmatrix} \quad (1)$$

The 3×3 matrix M includes 9 color separation coefficients m11, m12, m13, m21, m22, m23, m31, m32 and m33 as its matrix elements. In the case where the color signal processing device is provided with white balance sections 204, 205 and 206, diagonal elements m11, m22 and m33 of the matrix M is set at 1, and thus the matrix M substantially has 6 unique elements. If the color signal processing device is not provided with the white balance sections 204, 205 and 206, the matrix M has 9 unique elements.

The output of the matrix operation section 203 (the red signal r1, the green signal g1 and the blue signal b1) is transformed by the white balance sections 204, 205 and 206 as:

$$\begin{pmatrix} r2 \\ g2 \\ b2 \end{pmatrix} = WB \cdot \begin{pmatrix} r1 \\ g1 \\ b1 \end{pmatrix} \quad (2)$$

where WB is a 3×3 diagonal matrix having three diagonal elements (white balance coefficients) wbr, wbg and wbb.

Subsequently, the red signal r2, the green signal g2 and the blue signal b2 outputted by the white balance sections 204, 205 and 206 are supplied to gamma correction sections 207, 208 and 209 respectively. The gamma correction sections 207, 208 and 209 execute gamma correction to the red signal r2, the green signal g2 and the blue signal b2 respectively, and the output of the gamma correction sections 207, 208 and 209 (a red signal r3, a green signal g3 and a blue signal b3) is supplied to an output device 210.

The conventional color signal processing device and the conventional color signal processing method described above involve the following drawbacks or problems.

First, in the case where a general-purpose CPU is employed for color image signal processing, a digital camera for recording still images is necessitated to take a long time for executing and completing the color signal processing since the moment the shutter button is pushed. In digital cameras for recording moving pictures, the number of frames can not be set large in comparison with the case where a special-purpose image processing logic circuit is employed for color image signal processing, therefore, it is difficult to obtain enough smoothness of the moving picture. Such problems occur due to processing speed of the general-purpose CPU.

Second, in the case where a special-purpose image processing logic circuit is employed for color image signal processing, the logic circuit has to include a large number of multiplication circuits. Therefore, the number of gates (i.e. the circuit scale) of the special-purpose image processing logic circuit in the digital camera for still images or in the digital camera for moving pictures is necessitated to be large, and thus power consumption of the digital camera is necessitated to be large. Especially in the case of a portable digital camera which is powered by a battery pack or batteries, continuous use (operation) time of the digital camera is necessitated to be short.

The above problems occur since the number of multiplications required in the conventional color signal processing device and the conventional color signal processing method is large (9 multiplications per one pixel in the equations (1) and (2)) and thus the conventional device and method are not suitable for real-time color image signal processing. Even in the case where the color image signal processing is executed by a special-purpose image processing logic circuit, 9 multiplication circuits having large number of gates become necessary, and thus it is difficult to reduce the power consumption of the digital camera.

SUMMARY OF THE INVENTION

It is therefore the primary object of the present invention to provide a color signal processing device, by which necessary circuit scale and power consumption of the logic circuit can be reduced.

Another object of the present invention is to provide a color signal processing device, by which color image signal processing with increased processing speed can be realized.

Another object of the present invention is to provide a color signal processing method, by which necessary circuit scale and power consumption of the logic circuit can be reduced.

Another object of the present invention is to provide a color signal processing method, by which color image signal processing with increased processing speed can be realized.

In accordance with a first aspect of the present invention, there is provided a color signal processing device for processing color signals outputted by an image pickup device provided with a color filter having color areas of N colors ($N \geq 3$) corresponding to each pixel of the image pickup device, comprising a vector operation means for executing color space conversion. The vector operation means is supplied with a color signal which corresponds to the intensity of light that reached a pixel of the image pickup device through a color area of the color filter on the pixel, obtains a color signal component vector by multiplying the color signal by a vector having N vector elements, and thereby extracts N color signal components corresponding to the N colors from the color signal.

In accordance with a second aspect of the present invention, in the first aspect, the N color signal components extracted by the vector operation means are composed of a red signal component, a green signal component and a blue signal component.

In accordance with a third aspect of the present invention, in the first aspect, the N color signal components extracted by the vector operation means are composed of a magenta signal component, a cyan signal component, a green signal component and a yellow signal component.

In accordance with a fourth aspect of the present invention, in the first aspect, the color signal processing device further comprises a color interpolation means. The color interpolation means is placed after the vector operation means and executes vector interpolation using the color signal component vector of the pixel and color signal component vectors of adjacent pixels.

In accordance with a fifth aspect of the present invention, in the fourth aspect, the color signal processing device further comprises white balance means which are placed between the vector operation means and the color interpolation means.

In accordance with a sixth aspect of the present invention, in the fourth aspect, the color signal processing device further comprises white balance means which are placed after the color interpolation means.

In accordance with a seventh aspect of the present invention, in the first aspect, the color signal processing device comprises a CPU (Central Processing Unit) that is capable of executing multimedia instructions each of which makes the CPU execute a plurality of similar operations by one instruction, and the CPU capable of executing multimedia instructions executes the operation of the vector operation means.

In accordance with an eighth aspect of the present invention, in the seventh aspect, the multimedia instructions executed by the CPU are SIMD (Single Instruction Multiple Data) instructions.

In accordance with a ninth aspect of the present invention, in the fourth aspect, the color signal processing device comprises a CPU (Central Processing Unit) that is capable of executing multimedia instructions each of which makes the CPU execute a plurality of similar operations by one instruction, and the CPU capable of executing multimedia instructions executes the operation of the color interpolation means.

In accordance with a tenth aspect of the present invention, in the ninth aspect, the multimedia instructions executed by the CPU are SIMD (Single Instruction Multiple Data) instructions.

In accordance with an eleventh aspect of the present invention, there is provided a color signal processing method for processing color signals outputted by an image pickup device provided with a color filter having color areas of N colors ($N \geq 3$) corresponding to each pixel of the image pickup device. The color signal processing method comprises a color signal input step and a vector operation step. In the color signal input step, a vector operation means for executing color space conversion is supplied with a color signal which corresponds to the intensity of light that reached a pixel of the image pickup device through a color area of the color filter on the pixel. In the vector operation step, the vector operation means obtains a color signal component vector by multiplying the color signal by a vector having N vector elements and thereby extracts N color signal components corresponding to the N colors from the color signal.

In accordance with a twelfth aspect of the present invention, in the eleventh aspect, the N color signal components extracted in the vector operation step are composed of a red signal component, a green signal component and a blue signal component.

In accordance with a thirteenth aspect of the present invention, in the eleventh aspect, the N color signal components extracted in the vector operation step are composed of a magenta signal component, a cyan signal component, a green signal component and a yellow signal component.

In accordance with a fourteenth aspect of the present invention, in the eleventh aspect, the color signal processing method further comprises a color interpolation step after the vector operation step. In the color interpolation step, vector interpolation is executed using the color signal component vector of the pixel and color signal component vectors of adjacent pixels.

In accordance with a fifteenth aspect of the present invention, in the fourteenth aspect, the color signal processing method further comprises a white balance step between the vector operation step and the color interpolation step.

In accordance with a sixteenth aspect of the present invention, in the fourteenth aspect, the color signal processing method further comprises a white balance step after the color interpolation step.

In accordance with a seventeenth aspect of the present invention, in the eleventh aspect, the vector operation step is executed by a CPU (Central Processing Unit) that is capable of executing multimedia instructions each of which makes the CPU execute a plurality of similar operations by one instruction.

In accordance with an eighteenth aspect of the present invention, in the seventeenth aspect, the multimedia instructions executed by the CPU are SIMD (Single Instruction Multiple Data) instructions.

In accordance with a nineteenth aspect of the present invention, in the fourteenth aspect, the color interpolation step is executed by a CPU (Central Processing Unit) that is capable of executing multimedia instructions each of which makes the CPU execute a plurality of similar operations by one instruction.

In accordance with a twentieth aspect of the present invention, in the nineteenth aspect, the multimedia instructions executed by the CPU are SIMD (Single Instruction Multiple Data) instructions.

BRIEF DESCRIPTION OF THE DRAWINGS

The objects and features of the present invention will become more apparent from the consideration of the following detailed description taken in conjunction with the accompanying drawings, in which:

FIG. 3 is a schematic diagram showing an example of a color filter which is formed on the solid-state image pickup device;

FIG. 4 is a schematic diagram showing another example of a color filter which is formed on the solid-state image pickup device;

DESCRIPTION OF THE PREFERRED EMBODIMENTS

Figure 1:
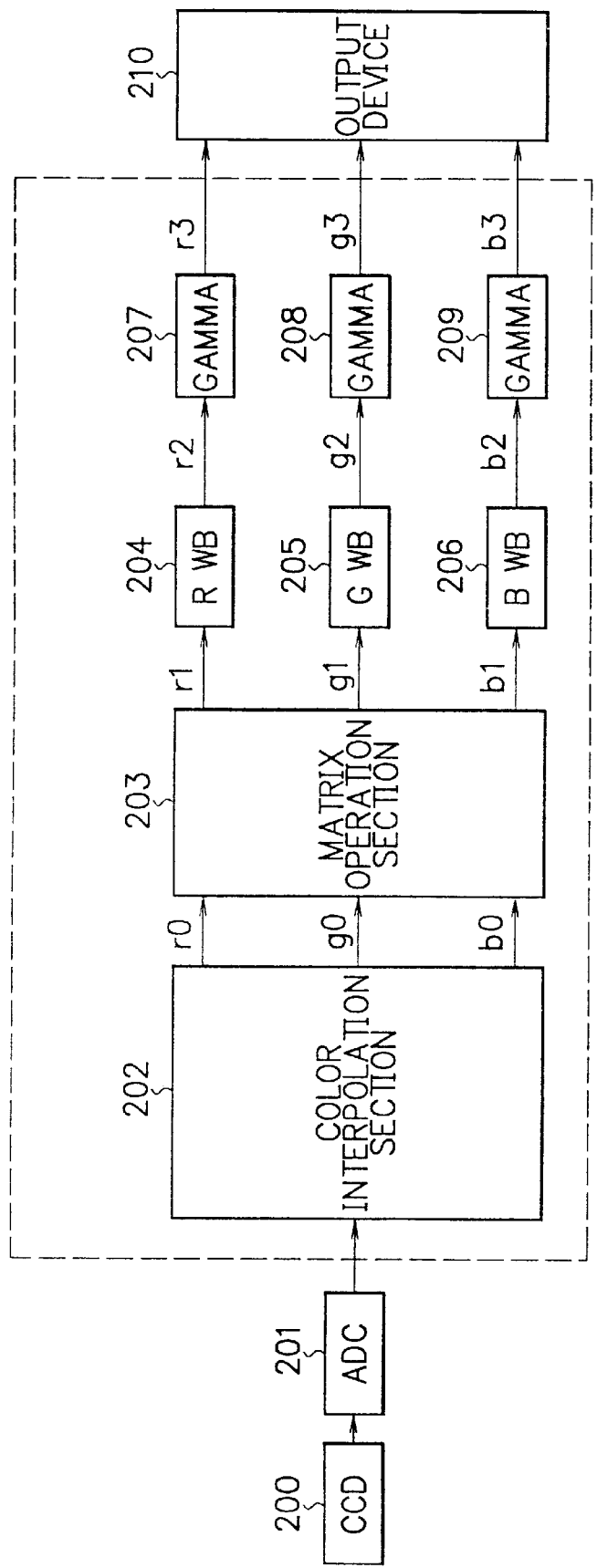
FIG. 1 is a block diagram showing an example of a conventional color signal processing device and a conventional color signal processing method for processing color signals outputted by a solid-state image pickup device.

Referring now to the drawings, a description will be given in detail of preferred embodiments in accordance with the present invention.

Figure 2:
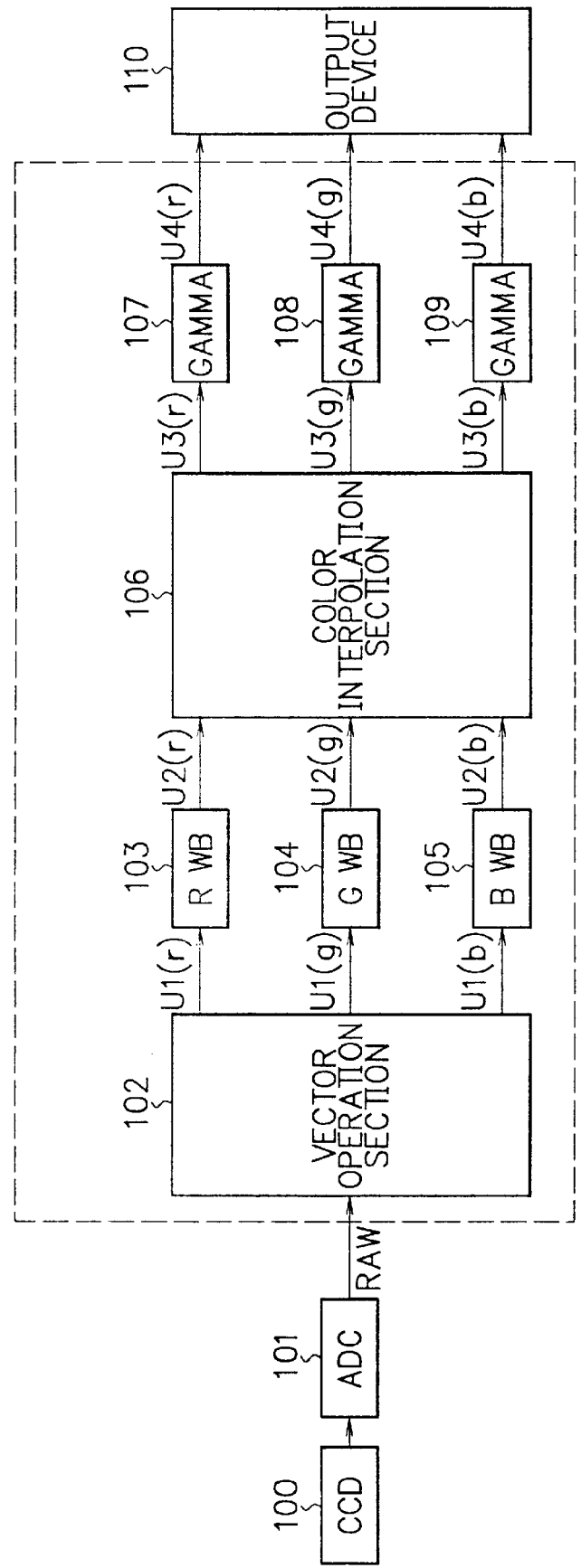
FIG. 2 is a block diagram showing part of a camera provided with a solid-state image pickup device, in which a color signal processing device and a color signal processing method according to an embodiment of the present invention are employed.

FIG. 2 is a block diagram showing part of a camera provided with a solid-state image pickup device, in which a color signal processing device and a color signal processing method according to an embodiment of the present invention are employed. Incidentally, the "camera" means a video camera for recording moving video pictures or a digital still camera for recording still images.

Referring to FIG. 2, the camera comprises a solid-state image pickup device (CCD) 100, an A/D converter 101, a vector operation section (color space conversion section) 102, white balance sections 103, 104 and 105, a color interpolation section 106, gamma correction sections 107, 108 and 109, and an output device 110.

The color signal processing device in the camera comprises the vector operation section 102 as the color space conversion section, the white balance sections 103, 104 and 105, the color interpolation section 106, and the gamma correction sections 107, 108 and 109.

In the color signal processing device of FIG. 2, a color interpolation section and a color space conversion section is placed in different order in comparison with the conventional color signal processing device of FIG. 1. In this interchange, the matrix operation section 203 in FIG. 1 as the color space conversion section having three inputs and three outputs is replaced by the vector operation section 102 as the color space conversion section having one input and three outputs.

The components of the color signal processing device of FIG. 2 are realized by, for example, one or more microprocessor units which are composed of one or more CPUs (Central Processing Units), ROM (Read Only Memory), RAM (Random Access Memory), etc. It is also possible to realize the components of the color signal processing device of FIG. 2 by software and a microprocessor unit for executing the instructions of the software.

The solid-state image pickup device 100 is covered by a color filter shown in FIG. 3 or FIG. 4 which is formed thereon. The letters "R", "G" and "B" in FIG. 3 indicate a red area, a green area and a blue area in the color filter of FIG. 3, respectively. The letters "Mg", "Cy", "G" and "Ye" in FIG. 4 indicate a magenta area, a cyan area, a green area and a yellow area in the color filter of FIG. 4, respectively. Incidentally, the color filter formed on the solid-state image pickup device 100 is not limited to the color filters of FIG. 3 and FIG. 4. The transmissive wavelength region of each area of the color filter and arrangement of the areas can be modified appropriately. Generally, a color filter having color areas of three or more colors is formed on the solid-state image pickup device 100. In the following, an example in which the color filter of FIG. 3 is formed on the solid-state image pickup device 100 will be explained, for instance.

Referring to FIG. 3, each area on the color filter with the letter "R", "G" or "B" corresponds to a pixel (element) of the solid-state image pickup device 100. The red area on the color filter transmits red light and filters out green light and blue light. The green area transmits green light and filters out blue light and red light. The blue area transmits blue light and filters out red light and green light. Each pixel (element) of the solid-state image pickup device 100 receives the red light, the green light or the blue light which passed the corresponding area of the color filter, and outputs an analog image output signal whose level corresponds to the intensity of the light that passed the corresponding area. The analog image output signal outputted by the solid-state image pickup device 100 is supplied to the A/D converter 101. The A/D converter 101 converts the analog image output signal into a digital signal "RAW" and outputs the digital signal RAW (i.e. a color signal) to the vector operation section 102 of the color signal processing device.

Therefore, a red signal RAW (r), a green signal RAW (g) or a blue signal RAW (b) is outputted by the A/D converter 101 as the digital signal RAW, depending on the color (red, green or blue) of the area of the color filter on the pixel. The vector operation section 102 extracts a red signal component, a green signal component and a blue signal component from the digital signal RAW (the color signal which corresponds to the intensity of light that passed the color area of the color filter) using a vector V having three elements (vr, vg, vb).

If we describe the vector V for the red area of the color filter as VR (vrr, vrg, vrb), the vector V for the green area of the color filter as VG (vgr, vgg, vgb), and the vector V for the blue area of the color filter as VB (vbr, vbg, vbb), the output vector UR1 of the vector operation section 102 when the red signal RAW (r) is inputted, the output vector UG1 of the vector operation section 102 when the green signal RAW (g) is inputted, and the output vector UB1 of the vector operation section 102 when the blue signal RAW (b) is inputted can be described as the following equations (3). Incidentally, in the following, matrixes and vectors are represented by capital letters, and scalar quantities are represented by small (lower-case) letters.

$$UR1 = \text{raw}(r) \cdot VR$$
$$UG1 = \text{raw}(g) \cdot VG \quad (3)$$
$$UB1 = \text{raw}(b) \cdot VB$$

In the equations (3), each of the output vectors (color signal component vectors) UR1, UG1 and UB1 of the vector operation section 102 has three vector elements corresponding to red, green and blue.

Figure 5:
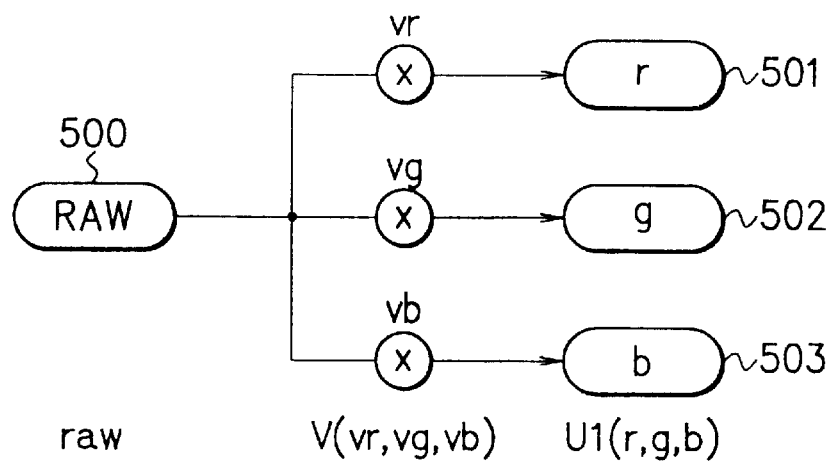
FIG. 5 is a schematic diagram showing vector operations which are executed by a vector operation section of the color signal processing device shown in FIG. 2.

FIG. 5 is a schematic diagram showing the vector operations of the equations (3) which are executed by the vector operation section 102. Referring to FIG. 5, the input signal RAW (500) is the output of the A/D converter 101. The vector V (vr, vg, vb) shown in FIG. 5 by which the input signal RAW 500 is multiplied is the vector VR (vrr, vrg, vrb) for the red area, the vector VG (vgr, vgg, vgb) for the green area, or the vector VB (vbr, vbg, vbb) for the blue area, that is employed depending on the color (red, green or blue) of the area of the color filter on the pixel. The output vector U1 shown in FIG. 5 (the output of the vector operation section 102) is the vector UR1, the vector UG1 or the vector UB1 which is shown in the equations (3). The output vector U1 of the vector operation section 102 has three vector elements: the red signal component "r" (501), the green signal component "g" (502) and the blue signal component "b" (503).

Incidentally, the vector VR (vrr, vrg, vrb), the vector VG (vgr, vgg, vgb) and the vector VB (vbr, vbg, vbb) corresponding to each color of the color filter can include white balance coefficients. If the white balance coefficients are not included in the vectors VR, VG and VB, one of the three vector elements is set at 1 (vrr=vgg=vbb=1).

Each vector element of the output vector U1 (UR1, UG1 or UB1) of the vector operation section 102 (i.e. each of the red signal component, the green signal component and the blue signal component) is supplied to the white balance sections 103, 104 and 105, respectively. Incidentally, the white balance sections 103, 104 and 105 are provided in order to handle the red signal component, the green signal component and the blue signal component, respectively.

If we describe the output of the white balance sections 103, 104 and 105 when the vector UR1 is inputted as UR2, the output of the white balance sections 103, 104 and 105 when the vector UG1 is inputted as UG2, and the output of the white balance sections 103, 104 and 105 when the vector UB1 is inputted as UB2, the white balance sections 103, 104 and 105 execute operations according to the following equations (4).

$$UR2 = WB \cdot UR1$$
$$UG2 = WB \cdot UG1 \quad (4)$$
$$UB2 = WB \cdot UB1$$

In the equations (4), the "WB" is a white balance coefficient matrix, which is a diagonal matrix having three diagonal elements wbr, wbg and wbb. Therefore, the number of multiplications per one pixel required in the equations (3) and (4) is 3 (in the case where the white balance coefficients are included in the vectors VR, VG and VB) or 5 (2+3: in the case where the white balance coefficients are not included in the vectors VR, VG and VB).

While the color interpolation section 202 of the conventional color signal processing device of FIG. 1 executed interpolation of scalar quantities, the color interpolation section 106 of FIG. 2 executes interpolation of vectors since the input to the color interpolation section 106 is vectors. The color interpolation section 106 executes interpolation as follows. For example, when the vector UR2 is supplied to the color interpolation section 106 as the output vector U2 of the white balance sections 103, 104 and 105, that is, when the color interpolation section 106 executes interpolation for a "red pixel" (i.e. a pixel under a red area of the color filter), there exists the vector UR2 for the red pixel but no vectors UG2 and UB2 exist for the red pixel. Therefore, the color interpolation section 106 obtains the vectors UG2 and UB2 for the red pixel by interpolation using vectors UG2 and UB2 of adjacent pixels. The color interpolation output vector U3 of the color interpolation section 106 for the red pixel is obtained by adding the vector UR2 of the red pixel, the vector UG2 obtained by the interpolation, and the vector UB2 obtained by the interpolation. The color interpolation section 106 also executes vector interpolations for green pixels and vector interpolations for blue pixels similarly.

Each vector element of the output vector U3 (r, g, b) of the color interpolation section 106 is supplied to the gamma correction sections 107, 108 and 109, respectively. The gamma correction sections 107, 108 and 109 execute gamma correction to each vector element of the vector U3 (r, g, b) respectively, and the output U4 (r, g, b) of the gamma correction sections 107, 108 and 109 is supplied to the output device 110. The output device 110 can be a storage device (such as memory, a magnetic disk unit, etc.), a display device (such as an LCD (Liquid Crystal Display)), a computer which is connected with the camera via a cable, a digital device which is connected with the camera via a network, etc.

Figure 6:
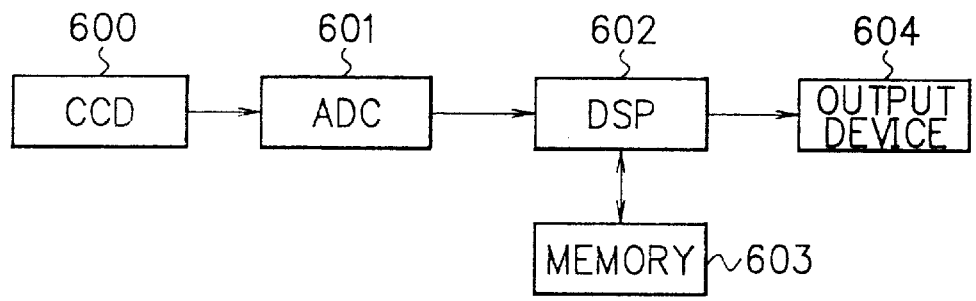
FIG. 6 is a block diagram showing an example of a color digital camera which realizes the color signal processing method shown in FIG. 2.

FIG. 6 is a block diagram showing an example of a color digital camera which realizes the color signal processing method which has been described referring to FIG. 2. The color digital camera of FIG. 6 includes a solid-state image pickup device (CCD) 600 provided with a color filter having color areas of three or more colors, an A/D converter 601, a special-purpose DSP (Digital Signal Processor) 602, a memory 603, and an output device 604. The color signal processing method described above is executed by the hardware logic circuit composed of the special-purpose DSP 602 and the memory 603. The memory 603 is used for storing values which are used for calculations by the DSP 602. The hardware logic circuit can execute the color signal processing with high speed and high energy efficiency. The number of necessary multiplication circuits having large number of gates can be reduced to 3 in comparison with the conventional color signal processing device, and thus power consumption of the color digital camera can be reduced.

Figure 7:
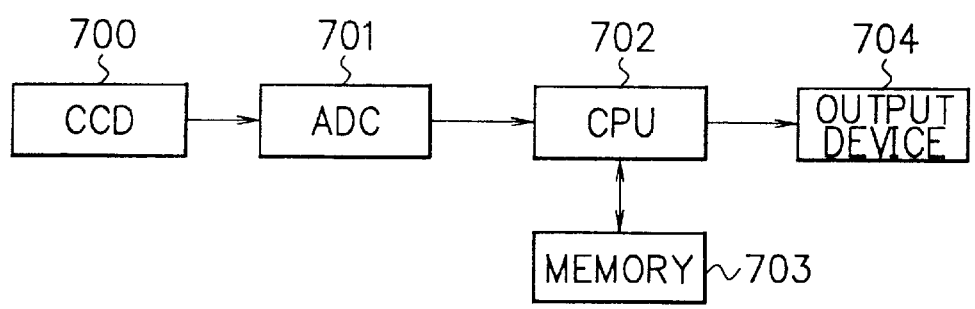
FIG. 7 is a block diagram showing another example of a color digital camera which realizes the color signal processing method shown in FIG. 2.

FIG. 7 is a block diagram showing another example of a color digital camera which realizes the color signal processing method which has been described referring to FIG. 2. The color digital camera of FIG. 7 includes a solid-state image pickup device (CCD) 700 provided with a color filter having color areas of three or more colors, an A/D converter 701, a general-purpose CPU (Central Processing Unit) 702, a memory 703, and an output device 704. The color signal processing method of the embodiment is realized by the CPU 702 and software which is stored in the memory 703. The memory 703 is utilized for storing the software and temporarily storing image data. Color signal processing by the CPU 702 is slower than that by the hardware logic circuit of FIG. 6, however, details of the color signal processing can easily be altered by modifying description of the software.

Figure 8:
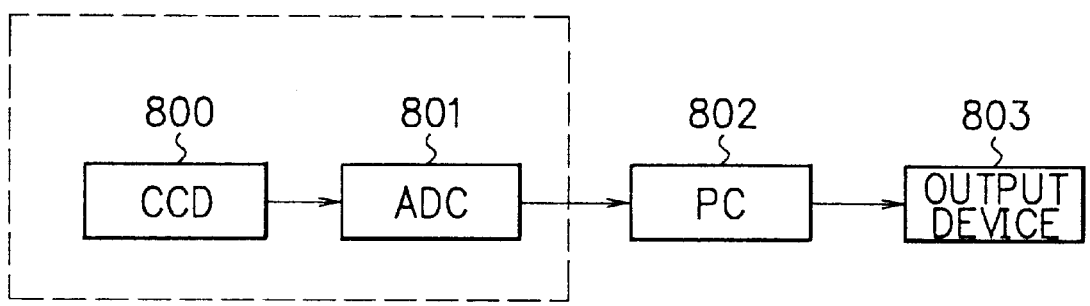
FIG. 8 is a block diagram showing an example of a combination of a color digital camera and a computer which realizes the color signal processing method shown in FIG. 2.

FIG. 8 is a block diagram showing an example of a combination of a color digital camera and a computer which realizes the color signal processing method which has been described referring to FIG. 2. Referring to FIG. 8, the color digital camera includes a solid-state image pickup device (CCD) 800 provided with a color filter having color areas of three or more colors, and an A/D converter 801. A personal computer (PC) (or a workstation, etc.) 802 is connected with the A/D converter 801 of the color digital camera via a digital interface and a cable. The personal computer 802 has a CPU and memory for executing the color signal processing method. An output device 803 such as a monitor (display device) for displaying color images is connected to the personal computer 802. By such composition, the color digital camera does not have to include the color signal processing device, and thus circuit scale, power consumption, weight, etc. of the color digital camera can be reduced.

In the case where a CPU is employed for executing the color signal processing method as shown in FIG. 7 and FIG. 8, multimedia instructions can be utilized. The multimedia instruction means an instruction which can make the CPU execute a plurality of similar operations (calculations) by one instruction, such as the SIMD (Single Instruction Multiple Data) instruction. By employing a CPU capable of processing such multimedia instructions, the time required for the multiplications of the equations (3) and (4) can be shortened further. An example of such a CPU capable of executing multimedia instructions is described in a document: M. R. Chudhury and J. S. Miller "A 300 MHz CMOS Microprocessor with Multimedia Technology", 1997 IEEE International Solid-State Circuits Conference, Digest of Technical Papers, First Edition Vol. 40, ISSCC, pages 170–171 (1997).

Figure 9:
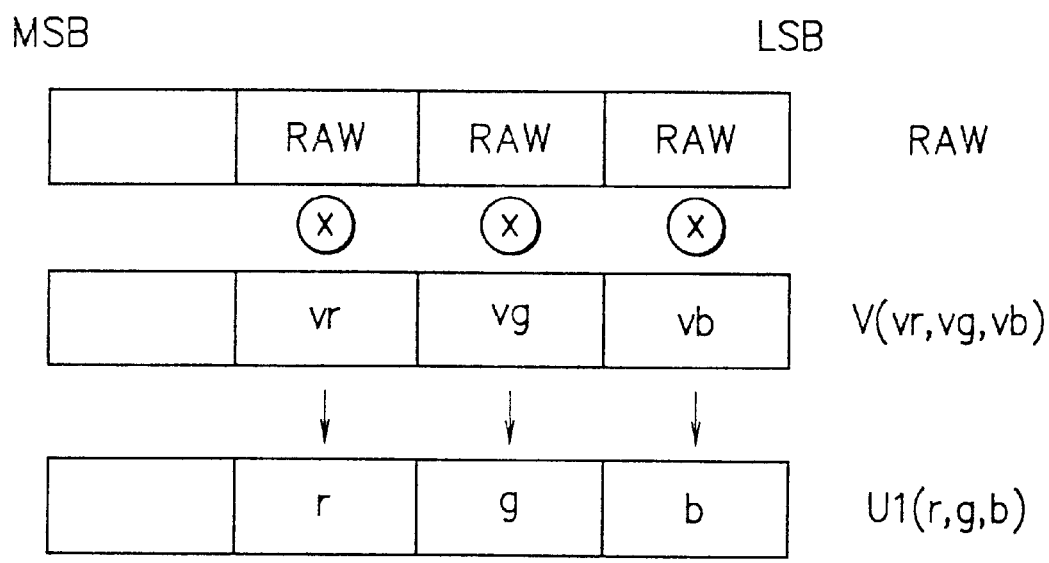
FIG. 9 is a schematic diagram showing registers for a multimedia instruction for executing the vector operations of FIG. 5.

FIG. 9 is a schematic diagram showing registers for a multimedia instruction for executing the vector operations of the equations (3) which have been shown in FIG. 5. The left-hand end of FIG. 9 corresponds to the MSB (Most Significant Bit) of each register, and the right-hand end of FIG. 9 corresponds to the LSB (Least Significant Bit) of each register. The registers are used for temporarily storing the scalar quantity RAW, the vectors VR, VG and VB, and the vectors UR1, UG1 and UB1 (the results of the vector operations) in the equations (3). Each vector shown in FIG. 9 has three vector elements corresponding to red, green and blue. The order of the vector elements in the register is not limited to the order shown in FIG. 9, and the register can have idle bits as shown in FIG. 9. For example, in the case of a 64-bit register, 16 bits are assigned to each vector element.

Using such registers, a multimedia instruction such as the multiplications of FIG. 5, additions, bit shifts, etc. is executed by the CPU. In the case of FIG. 9, the input signal RAW (500) is the output of the A/D converter 101. The vector V (vr, vg, vb) shown in FIG. 9 by which the input signal RAW 500 is multiplied is the vector VR (vrr, vrg, vrb) for red, the vector VG (vgr, vgg, vgb) for green, or the vector VB (vbr, vbg, vbb) for blue, that is employed depending on the color (red, green or blue) of the area of the color filter on the pixel. The output vector U1 of the vector operation section 102 (the result of the multiplications) is the vector UR1, the vector UG1 or the vector UB1 which is shown in the equations (3). The output vector U1 has three vector elements: the red signal component "r" (501), the green signal component "g" (502) and the blue signal component "b" (503).

In the case where general purpose CPUs are employed for the color interpolation section 106 and the color interpolation section 202 of the conventional color signal processing device of FIG. 9, the vector operations (vector interpolation) executed by the color interpolation section 106 takes more time than the scalar operations executed by the color interpolation section 202 of the conventional color signal processing device. However, by employing such a CPU capable of executing multimedia instructions, high speed vector operation can be done and thus the processing time of the color interpolation section 106 can be shortened to the level of the color interpolation section 202 of the conventional color signal processing device.

As described above, in the color signal processing device and the color signal processing method according to the embodiment of the present invention, the vector operation section 102 is provided in order to execute the color space conversion, and thus the matrix operation section 203 employed in the conventional color signal processing device becomes unnecessary, thereby the number of necessary multiplications is reduced. By use of the multimedia instructions such as the SIMD instructions and by increasing bit width of registers, processing time of the CPU can be shortened, and the vector operations and the color interpolations can be executed with high efficiency. By the composition, circuit scale and power consumption of the color signal processing device can be reduced and processing speed of the color signal processing can be increased.

Incidentally, while the above explanation of the embodiment has been given on the assumption that the color filter of FIG. 3 is formed on the solid-state image pickup device 100 of the camera, of course, the color signal processing device and the color signal processing method according to the present invention can also be applied to a camera having an image pickup device on which the color filter of FIG. 4 is formed. Further, as mentioned before, the color filter formed on the image pickup device of the camera is not limited to the color filters of FIG. 3 and FIG. 4, and the transmissive wavelength region of each area of the color filter and arrangement of the areas can be modified appropriately in the camera to which the color signal processing device and the color signal processing method according to the present invention are applied.

In addition, while the white balance sections 103, 104 and 105 have been provided between the vector operation section 102 and the color interpolation section 106 in the above embodiment, it is also possible to provide the while the white balance sections 103, 104 and 105 after the color interpolation section 106.

As set forth hereinabove, in the color signal processing device and the color signal processing method according to the present invention, a vector operation section instead of a matrix operation section is employed for executing the color space conversion, thereby the number of multiplications necessary for obtaining an output signal for one pixel can be decreased. Therefore, color signal processing time of single CCD color cameras including digital still cameras and video cameras can be decreased, and circuit scale, power consumption and manufacturing cost of the single CCD color cameras can be reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A color signal processing device for processing color signals comprising:

an image pickup device provided with a color filter having color areas of N colors (N $\geq$ 3) corresponding to each pixel of the image pickup device; and a vector operation means for executing color space conversion, the vector operation means is supplied with a color signal which corresponds to the intensity of light that reached a pixel of the image pickup device through a color area of the color filter on the pixel, the vector operation means obtained a color signal component vector by multiplying the color signal by a vector having N vector elements, and thereby extracts N color signal components corresponding to the N color from the color signal;

a color interpolation means which is placed after the vector operation means for executing vector interpolation using the color signal component vector of the pixel and color signal component vectors of adjacent pixels; and further comprising a plurality of white balance means which are placed between the vector operation means and the color interpolation means.

2. A color signal processing method for processing color signals outputted by an image pickup device provided with a color filter having color areas of N colors (N$\geq$2) corresponding to each pixel of the image pickup device, comprising:

a color signal input step in which a vector operation color space conversation is supplied with a color signal which corresponds to the intensity of light that reached a pixel of image pickup device through a color area of the color filter on the pixel; and a vector operation step in which the vector operation means obtains a color signal component vector by multiplying the color signal by a vector having N vector elements and thereby extra N color signal components corresponding to the N colors from the color signal;

a color interpolation step after the vector operation step, for executing vector interpolation using the color signal component vector of the pixel and color signal component vectors of adjacent pixels; and a white balance step between the vector operation step and the color interpolation step.

* * * * *